United States Patent
Casper et al.

(10) Patent No.: US 9,321,223 B2
(45) Date of Patent: Apr. 26, 2016

(54) REPAIR PATCH FOR AN ELASTOMER COMPONENT, IN PARTICULAR FOR A VEHICLE TIRE, HAVING INCREASED ADHESIVE STRENGTH

(75) Inventors: Christian Casper, Mark Indersdorf (DE); Christian Rauch, Munich (DE); Patric Scheungraber, Pliening (DE)

(73) Assignee: REMA TIP TOP GMBH, Poing (DE)

( * ) Notice: Subject to any disclaimer, the term of this patent is extended or adjusted under 35 U.S.C. 154(b) by 0 days.

(21) Appl. No.: 13/502,652

(22) PCT Filed: Oct. 8, 2010

(86) PCT No.: PCT/EP2010/006171
§ 371 (c)(1),
(2), (4) Date: Jun. 7, 2012

(87) PCT Pub. No.: WO2011/054431
PCT Pub. Date: May 12, 2011

(65) Prior Publication Data
US 2012/0247648 A1  Oct. 4, 2012

(30) Foreign Application Priority Data
Oct. 27, 2009  (DE) .......................... 10 2009 050 899

(51) Int. Cl.
*B29C 73/00*  (2006.01)
*C09J 4/00*  (2006.01)
(Continued)

(52) U.S. Cl.
CPC ............... *B29C 73/10* (2013.01); *B29C 65/483* (2013.01); *B29L 2030/00* (2013.01); *Y10T 428/1471* (2015.01); *Y10T 428/2826* (2015.01)

(58) Field of Classification Search
CPC .......... B32B 7/12; B29C 73/10; B29C 73/06; B29C 65/483; B29L 2020/00; Y10T 152/10882; Y10T 152/10909
USPC ............ 156/94, 96, 367, 565, 97, 338; 428/41.7, 63, 349; 152/367
See application file for complete search history.

(56) References Cited

U.S. PATENT DOCUMENTS 1,591,817 A  7/1926 Hawkinson
3,039,509 A * 6/1962 Gruber .......................... 152/367
(Continued)

FOREIGN PATENT DOCUMENTS

DE  1 129 279  5/1962
DE  296 10 697 U1  10/1996
(Continued)

OTHER PUBLICATIONS

International Search Report issued in International Patent Application No. PCT/EP2010/006171 dated Feb. 24, 2011 (with translation).
(Continued)

*Primary Examiner* — Philip Tucker
*Assistant Examiner* — Brian R Slawski
(74) *Attorney, Agent, or Firm* — Oliff PLC

(57) ABSTRACT

A repair patch for an elastomer component, in particular for a vehicle tire, includes a cover layer, a connecting layer for contacting a wall of the elastomer component and at least one intermediate layer arranged between the connecting layer and the cover layer. The connecting layer has such a initial tack before vulcanization with the elastomer component that a connection between the repair patch and the elastomer component transmits at least the own weight of the repair patch and the connecting layer has a separation value of at least 5 N/mm after vulcanization with the elastomer component.

7 Claims, 5 Drawing Sheets

(51) Int. Cl.
*B32B 37/00* (2006.01)
*B29C 65/00* (2006.01)
*C09J 101/00* (2006.01)
*C09J 201/00* (2006.01)
*B32B 3/26* (2006.01)
*B32B 7/12* (2006.01)
*B32B 15/04* (2006.01)
*B29C 73/10* (2006.01)
*B29C 65/48* (2006.01)
*B29L 30/00* (2006.01)

(56) References Cited

U.S. PATENT DOCUMENTS 3,296,061 A * 1/1967 Borland et al. ............... 428/448
4,285,382 A * 8/1981 DiRocco et al. ............. 152/367
5,262,237 A * 11/1993 Chen et al. .................. 427/393.5
5,643,648 A * 7/1997 Kobe et al. ...................... 428/63
5,695,577 A 12/1997 Ferrara

FOREIGN PATENT DOCUMENTS

| EP | 1 864 786 A1 | 12/2007 | |
|---|---|---|---|
| RO | 93933 A * | 5/1988 | ............... C08L 7/00 |
| WO | WO 2008/147413 A1 | 12/2008 | |
| WO | WO 2009/061234 A1 | 5/2009 | |

OTHER PUBLICATIONS

Sep. 27, 2013 Patent Examination Report No. 1 issued in Australian Patent Application No. 2010314516.

Translation of Apr. 1, 2014 Office Action issued in Japanese Patent Application No. 2012-535651.

* cited by examiner

REPAIR PATCH FOR AN ELASTOMER COMPONENT, IN PARTICULAR FOR A VEHICLE TIRE, HAVING INCREASED ADHESIVE STRENGTH

The present invention relates to a repair patch for an elastomer component, in particular for a vehicle tire, and a method for repairing the elastomer component with the repair patch having an increased initial tack before the vulcanization of the repair patch without using an additional adhesive. Furthermore, the connection of the repair patch to the elastomer component has an improved strength after vulcanization.

The repair of a damaged vehicle tire the in case of small stitch damage in the wheel tread area is performed by using a so-called combined repair body while in the case of greater damage in the wheel tread or side wall area after preparing the damage spot the thus created so-called cone is filled with raw rubber and the reinforcement carriers interrupted in the damage area are bridged by means of a repair patch which in turn contains corresponding reinforcement carriers. As the flow of force in the reinforcement carriers must be transmitted from vehicle tires and repair patches to the intermediate rubber layers, high requirements are made of the connecting layer in particular between the vehicle tire and repair patch regarding a safe and permanent connection to the vehicle tire.

In the known methods of the installation of a repair patch in a vehicle tire, two components are required for ensuring a permanent connection of repair patch and vehicle tire, namely the so-called connecting layer of the repair patch and the adhesive.

Usually, the connecting layer consists of masticated natural rubber and resins and contains no accelerators.

The adhesive consists of natural rubber dissolved in solvents, resins and contains the accelerator required for the reaction, in particular for the vulcanization, without which a vulcanization of the connection will not occur.

In the known repair methods of vehicle tires, the repair spot is cleaned and roughened before the repair patch is applied to create an active surface with a high structure. In the next step the adhesive is applied to the repair spot. Next, the solvent of the adhesive must be allowed to evaporate. After that, the repair patch is contacted to the repair spot and pressed on. Depending on the method selected, the vulcanization is performed without pressure at room temperature or by the influence of pressure and temperature by using suitable devices (e.g. in an autoclave or in a heating press). The disadvantage of these methods is the time required for evaporating the solvent.

Furthermore, the known adhesives are based on organic solvents whereby they may basically represent a danger to the environment and the user so that even at the moment some of these solvents may no longer be used to repair objects made of rubber in a number of countries. Furthermore, the evaporation of the solvent is demanding because the adhesiveness of the repair patch strongly depends on the degree of evaporation. If the adhesive has dried too long, no sufficient adhesiveness is achieved (over-drying). If on the contrary the drying or evaporation time has been calculated too short, too much solvent is left in the repair spot so that the adhesiveness of the repair patch is not ensured either because the solvent remaining in the repair spot leads to the formation of bubbles particularly in case of a vulcanization under temperature. When inflammable solvents are used, corresponding measures for avoiding fires, for example by means of suction and ventilation, will have to be taken additionally.

It is an object of the present invention to provide a repair patch for repairing elastomer components in which a sufficiently high initial tack for fixing the repair patch before the vulcanization with the elastomer component is achieved without the use of an adhesive on the one hand, and the strength of the connection after vulcanization at least reaches or exceeds the values of conventional methods on the other hand. Furthermore, the repair patch is intended to have a long storage life without loss of this sufficiently high initial tack.

This object is achieved according to the invention by the features of claim 1 as well as the method of claim 14. Advantageous designs and preferred embodiments of the invention are stated in the subclaims.

The terms "auto adhesion", "adhesiveness", "self-adhesiveness" or "initial tack", which are often used equivalently, designate the ability of two surfaces of the same material to form a strong connection upon contacting that counteracts the separation of the surfaces. For the quantitative characterization of this property the force required for separation may be stated, the separation conditions having to be defined in dependence of fracture mechanical knowledge and use-specific criteria.

However, in the following the term of "initial tack" is not to be limited to a connection of two surfaces of the same material but also encompass a connection of different materials.

If the initial tack is too low, there is no guarantee that the repair patch will remain in the desired installation position after it has been attached to the vehicle tire until completion of the vulcanization process and consequently the cohesion of the connecting layer of the repair patch with the inner wall of the tire is not ensured either. If, however, the initial tack is too high, this may promote the entry of undesired air pockets whereby a degraded welding of the connecting layer with the vehicle tire may occur in the subsequent vulcanization process.

Therefore, the initial tack should be adapted such that when the repair patch is installed, a uniform linking to the substructure across the whole surface will be ensured, that is, to the inner liner in tubeless tires and to the rubberized carcass in tube type tires.

According to the invention, a repair patch for an elastomer component, in particular for a vehicle tire, is provided that comprises a cover layer, a connecting layer for contacting a wall of the elastomer component, and at least one intermediate layer arranged between the connecting layer and the cover layer. The connecting layer has such a initial tack before vulcanization with the elastomer component that a connection between the repair patch and the elastomer component transmits at least the own weight of the repair patch, and the connecting layer has a separation value of at least 5 N/mm after vulcanization with the elastomer component.

The values stated for the separating force relate to a butyl rubber-based reference material (of the test piece). In comparing tests with truck tires of different manufacturers separation values were obtained depending on the brand that are higher by a factor of 1 to 3 as compared to the reference material.

This inventive structure of the repair patch offers the advantage that thus the application of the adhesive is omitted and, resulting therefrom, no solvent vapors are released due to ventilating. Therefore, no more ventilating time is required whereby the course of the repair is accelerated. Moreover, the above mentioned fire protection and the suction of the solvent vapors can be omitted.

Another advantage of the present repair patch is the fact that the use of an adhesive is dispensable for obtaining initial tack which realizes the connection between the repair patch and the wall before the vulcanization of the connecting layer and in this course fixes the repair patch to the elastomer component at the repair spot. Thus, due to its initial tack, in particular for use in a vulcanization of the repair of a vehicle tire in an autoclave, the present repair patch is able to keep its desired installation position on the vehicle tire after application to the elastomer component until the vulcanization of the connecting layer also during the transport to the autoclave and orientation of the vehicle tire in the latter.

Additionally, the present repair patch offers the advantage that it develops or has the necessary initial tack at the time of installation, whereby its handling and storage life are improved.

The test procedure for determining the separation value associated with the initial tack is preferably the procedure according to DIN EN 28510 or ISO 8510. Before the separation value is determined, the repair patch may at first either be heated to a preheating temperature or used at room temperature, and said patch is then applied to an elastomer component or a component test piece. Subsequently, after one hour during which the test piece rests at room temperature, the procedure according to DIN EN 28510 or ISO 8510 is performed.

Preferably, in a present repair patch the initial tack of the connecting layer before the vulcanization to the elastomer component may be at least 0.8 N/mm.

For the so-called hot separation value in particular (to this end, the rest piece is heated to 90° C. before testing), the present repair patch shows higher values than a conventional repair patch, that is, one fixed by using an adhesive. One cause for this behavior is i.a. that a better connection is achieved between the elastomer component and the connecting layer of the repair patch due to the non-existing adhesive layer. The solids contained in the adhesive, particularly the resins added for initial tack, seem to cause a decrease of the separation values especially in the case of higher temperatures due to the material-caused softening behavior of the resins.

Furthermore, in a repair patch the initial tack of the connecting layer can be adapted before the vulcanization thereof to the elastomer component via the selection of a preheating temperature which is at least the room temperature and is below the vulcanization temperature of the connecting layer.

Preferably, in a repair patch the connecting layer may be adapted such that a separation value of at least 1 N/mm can be achieved in a first temperature interval before vulcanization. Preferably, the maximum temperature of the first temperature interval is smaller than the vulcanization temperature of the connecting layer.

In a preferred variant of the repair patch, the connecting layer may be formed such that the separation value or the initial tack abruptly increases in the temperature interval, the first temperature interval being substantially between 60° C. and 70° C. and below the vulcanization temperature of the connecting layer. The first temperature interval may comprise, for example, a temperature difference between the maximum temperature and the minimum temperature of substantially 10K. Furthermore, the predetermined temperature interval may comprise a temperature difference between the maximum temperature and the minimum temperature of substantially 5K.

Furthermore, in a repair patch, the connecting layer may be formed such that the separation value remains substantially constant or increases for temperatures higher than the temperatures of the first temperature interval.

Furthermore, in a present repair patch, the connecting layer may contain between 20 and 70% of masticated natural rubber. Furthermore, the connecting layer may contain 2 to 10% of liquid polyisoprene rubber. Moreover, the connecting layer may contain 1 to 10% of resins, preferably Koresin resin. The combination of these three components has proven to be particularly advantageous regarding the temperature-dependent initial tack.

Preferably, in a repair patch, the share of masticated natural rubber in the connecting layer may be 35 to 60%. Furthermore, the share of liquid polyisoprene rubber in the connecting layer may preferably be 5 to 7%. Moreover, the share of Koresin resin in the connecting layer may preferably be 2 to 4%. The mixture components missing for 100% consist of fillers (e.g. carbon black, silica, chalk), reaction mediators (sulphur, retarding agents, accelerators, zinc oxide), plasticizers, processing aids (stearic acid) and antioxidants.

Furthermore, in a repair patch, the connecting layer may contain an accelerator system which reacts only at temperatures above 90° C.

Preferably, in a present repair patch, the accelerator system of the connecting layer may contain at least 0.5% of a thiazole accelerator or an accelerator from the group consisting of sulfenamides, carbamates or thiurames and at least 0.2% of a secondary accelerator from the group of guanidines or any other aminic accelerator. The accelerators are selected such that when there is no reaction at ambient temperature, the storage life of the product is thus ensured. The thiazole accelerator causes a cross-linking reaction which sets in at a temperature of 90° C. The secondary accelerator increases the reaction speed and thus reduces the time required for cross-linking.

In a preferred variant of the repair patch, at least a peelable protection film may be provided that protects the connecting layer against contamination until it is used.

Furthermore, in a repair patch, the intermediate layer may have a plurality of filamentary inserts substantially arranged in a structured manner.

Furthermore, the present invention comprises the use of a repair patch for repairing a damaged vehicle tire.

A method for connecting a repair patch to a vehicle tire may comprise the steps of providing an elastomer component, attaching the repair patch to the elastomer component, in particular at a repair spot. Moreover, the method may comprise the step of vulcanization of the repair patch on the elastomer component, the separation value being at least 5 N/mm after the vulcanization of the connecting layer of the repair patch with the elastomer component.

Furthermore, the method may comprise the step of preheating the repair patch to a preheating temperature before it is attached to the elastomer component, said temperature being below the vulcanization temperature of the connecting layer of the repair patch.

Advantageous designs and further details of the present invention will be described in the following by using various embodiments with reference to schematic drawings.

Figure 1:
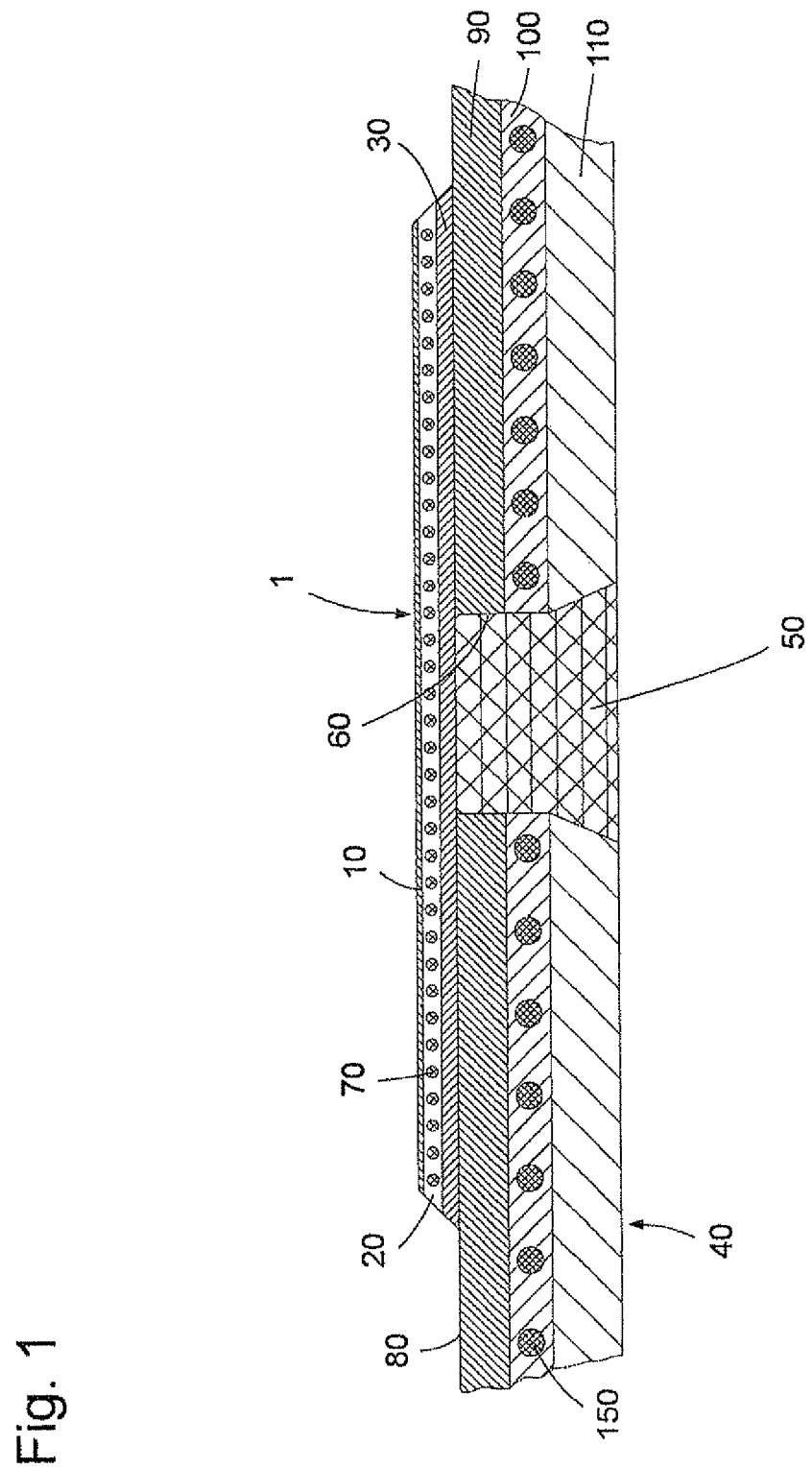
FIG. 1 shows a side view of a repair patch for vehicle tires according to the present invention.

Referring to FIG. 1, a repair patch 10 for vehicle tires according to the present invention is schematically shown. A cover layer 10 is formed on the top surface of the repair patch 1, which has no initial tack before and after the repair. Adjacent to the cover layer 10 an intermediate layer 20 is formed that has a plurality of filamentary inserts 70. These inserts 70 usually are disposed across the thickness of the intermediate layer 20 in one or more layers, each individual layer having a structural arrangement of the filamentary inserts. The orientation of the individual layers in the intermediate layer 20 may be different in relation to each other. Particularly in case of larger damage in the tread or side wall ranges these inserts 70 serve to bridge the reinforcement carriers interrupted in the damage area.

On the bottom surface of the repair patch 1 the connecting layer 30 is formed which contacts the wall 80 of the vehicle tire during and after the repair. Furthermore, the connecting layer 30 contacts a natural rubber mass 50 before and after the vulcanization of the vehicle tire.

Within the frame of the repair of the damaged vehicle tire, the damaged part of the vehicle tire is roughened so that dust and dirt are removed and an undamaged layer of the components contained in the vehicle tire is exposed, a substantially conical form being formed for a repair spot 60 in the vehicle tire. Then, the repair spot 60 is filled with the natural rubber mass 50 before the vulcanization of the connecting layer 30.

Next, the repair patch 1 preheated to a corresponding joining temperature is applied to the repair spot 60, the dimensions thereof being selected such that the repair spot 60 is completely covered by the same. Furthermore, the dimensions of the repair patch 1 should be selected such that the wall 80 of the tire is sufficiently covered by the connecting layer 30 for a stable connection.

After pressing on the repair patch, the vulcanization of the repair spot and the repair patch is performed under pressure and temperature by using a suitable device or in the autoclave.

Here, the structure of the vehicle tire is exemplarily illustrated for the flank area of a radial truck tire such that the wall 80 of the vehicle tire is formed by the inner liner 90, the carcass 100 having the cord 150 in the form of an insert adjoining the latter. The side wall rubber 110 of the vehicle tire is located adjacent to the carcass 100.

Figure 2:
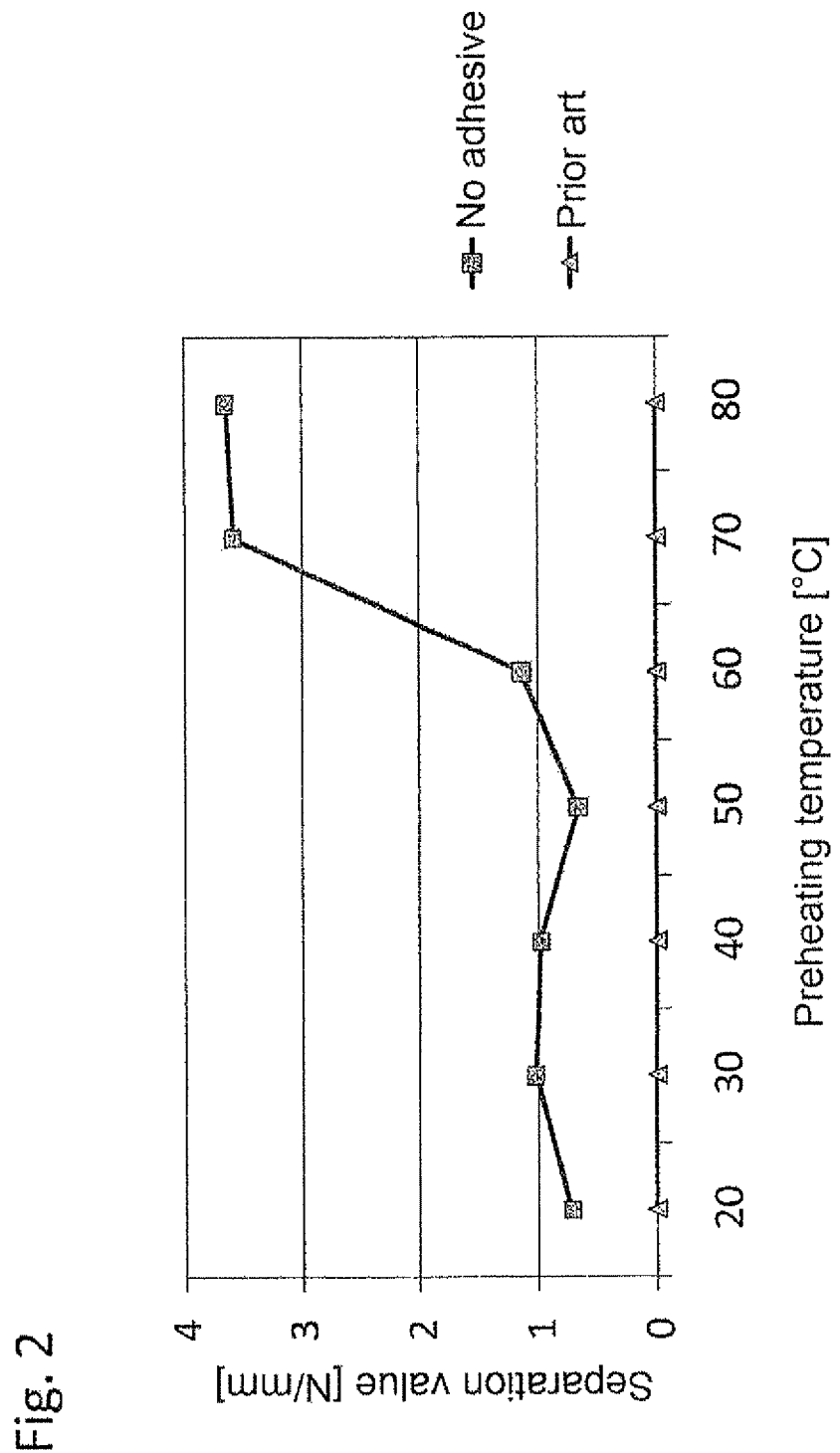
FIG. 2 shows a graphic illustration of the separation value of various repair patches in dependence of the preheating temperature.

FIG. 2 shows a comparison of the measured separation values in dependence of the preheating temperature between a known repair patch according to the related art that was applied by using an adhesive and a present repair patch without using an adhesive.

The separation values 2 shown in FIG. 2 were measured after one hour and the cooling of the test piece to room temperature, respectively, in accordance with the standardized test procedure according to DIN EN 28510 and/or ISO 8510.

At room temperature, the present connecting layer of the repair patch (illustrated by way of square symbols) shows a predetermined initial tack already at room temperature and thus a predetermined separation value as compared to the known repair patch (illustrated by triangular symbols), the handling of the repair patch during fixation to the installation spot not yet being affected.

When the present connecting layer is heated before the fixation to the repair patch and the vulcanization of the connecting layer, an abrupt increase of the measured separation value will be observed in the range of 60° C. to 70° C. If the preheating temperature is selected to be higher than 70° C., another slight increase in relation to the separation value at 70° C. is shown.

In this course, the present connecting layer enables safe adhesion both in the case of tube type tires, that is, on the inner liner of the vehicle tire consisting mainly of butyl rubber, and in the case of tube type tires, that is, on the tire carcass.

Repair patches having a present connecting layer can preferably be used for hot vulcanization. However, on principle an embodiment is also conceivable in which the connecting layer is activated by heating and the vulcanization process may subsequently also be performed at room temperature.

Figure 3:
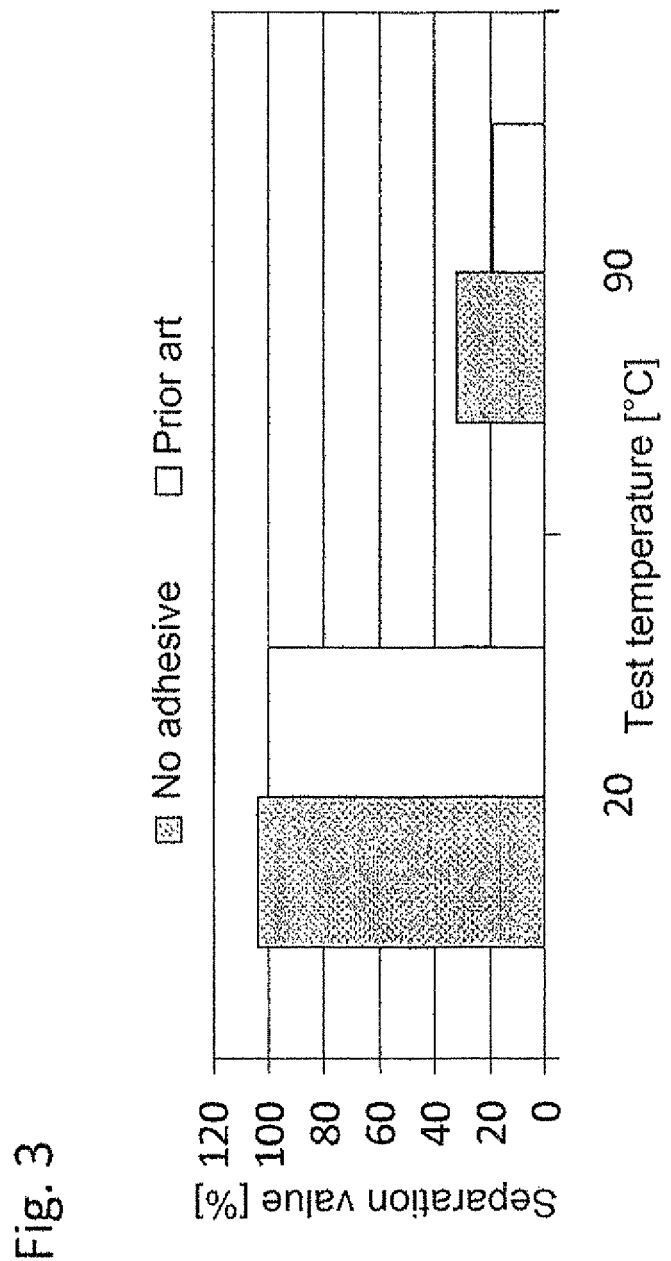
FIG. 3 shows a graphic illustration of the separation values of various repair patches in dependence of the test temperature.

FIG. 3 shows a graphic illustration of the separation values of various repair patches in dependence of the test temperature. To this end, a respective present repair patch was compared with a known repair patch at various test temperatures for obtaining the separation value. Thus, it was shown that the separation value at 20° C. of the present repair patch is increased by 4 percentage points relative to the known repair patch so that an improved strength of the present repair patch was attained. A more significant increase of the strength of the connection between the repair patch and the test piece is shown at a test temperature of 90° C. where the separation value of the present repair patch is increased by even 13 percentage points relative to known repair patches.

Figure 4:
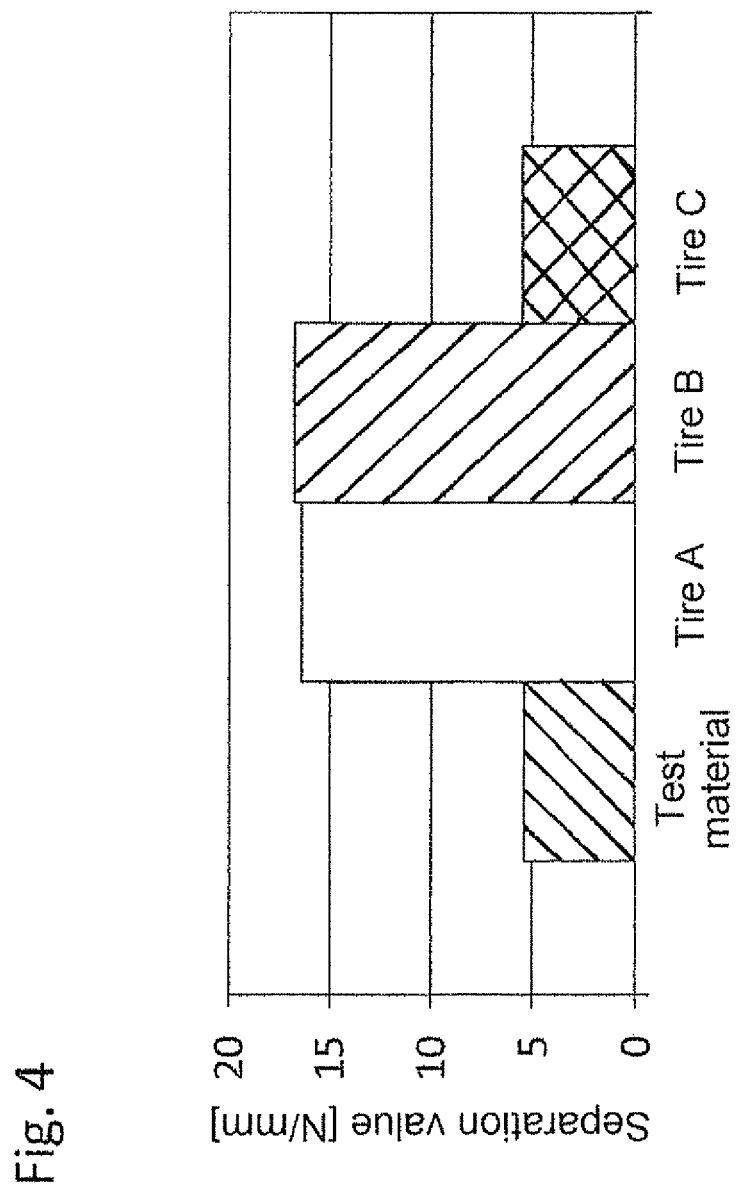
FIG. 4 shows the dependence of the separation value of a repair patch of the material of the elastomer component in a graphic illustration.

FIG. 4 shows a graphic illustration of the dependence of the separation value of a repair patch of the material of the elastomer component, in this case a vehicle tire. The bars of the Figure respectively represent the separation value at a test temperature of 20° C. after the repair patch had previously been vulcanized to the vehicle tire or the test material in an autoclave.

When a test material is used, that is, a test piece the design of which does not correspond to a vehicle tire but a substantially rectangular flat test piece, a reference separation value of 5.4 N/mm was measured. If in contrast thereto the present repair patch is attached to the tire of manufacturer A or manufacturer B, as described above, a separation value of 14.6 N/mm and 16.7 N/mm, respectively, will result. In contrast thereto, a separation value of 5.5 N/mm resulted for the connection to a vehicle tire of manufacturer C.

Figure 5:
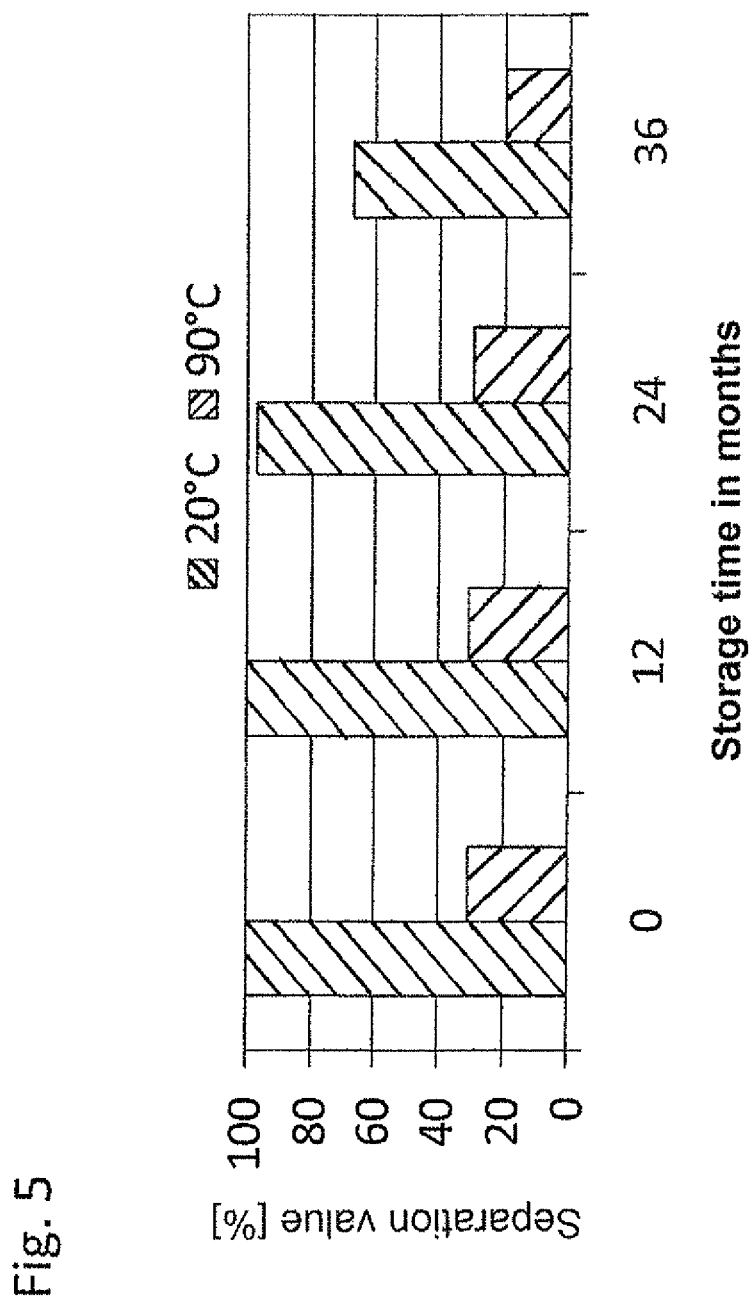
FIG. 5 shows the dependence of the separation value of a present repair patch of the storage time in a graphic illustration.

FIG. 5 shows a graphic illustration of the dependence of the separation value of a present repair patch of the storage time. For example, at a test temperature corresponding to room temperature, a decrease of the separation value is observed when storage time increases, the separation value substantially corresponding to the reference separation value for a time period of 24 months. In this example, the reference separation value is determined from the separation value which is measured without storage life at a test temperature corresponding to room temperature upon connecting a present repair patch that is applied to the test piece of FIG. 4. Merely in the case of a storage life exceeding a time period of 24 months a decrease of the separation value to about two thirds of the initial value is observed in this example.

A qualitatively similar course is observed when considering the separation value at which the test piece was previously heated to 90° C., the reference value of the present repair patch in this example being at about one third of the corresponding value for a test temperature at room temperature.

The embodiments as shown are to be interpreted merely as illustrative and not limiting. Numerous modifications may be made to them without leaving the scope of protection of the claims.

The invention claimed is:

1. A repair patch for an elastomer component, comprising:
   a cover layer,
   a connecting layer for contacting a wall of the elastomer component, and at least one intermediate layer arranged between the connecting layer and the cover layer, wherein:

each layer of the repair patch has a substantially rectangular cross section, the connecting layer has an initial tack before vulcanization with the elastomer component such that a connection between the repair patch and the elastomer component supports at least a weight of the repair patch, the connecting layer has a separation value of at least 5 N/mm after vulcanization with the elastomer component, 20% to 70% of the connecting layer is masticated natural rubber, 2% to 10% of the connecting layer is liquid polyisoprene rubber, and 1% to 10% of the connecting layer is resin, the connecting layer contains an accelerator system that reacts only at temperatures above 90° C., 2.5% or less of the connecting layer is the accelerator system, the accelerator system containing at least 50% of a thiazole accelerator and at least 35% of a secondary accelerator from the group of guanidines or any other aminic accelerator, the connecting layer is configured such that a separation value of at least 1 N/mm can be achieved in a first temperature interval before vulcanization, the connecting layer is formed such that the separation value abruptly increases in said first temperature interval, the first temperature interval being substantially between 60° C. and 70° C., and below the vulcanization temperature of the connecting layer, and the intermediate layer has a plurality of filamentary inserts disposed across a thickness and an entire plane of the intermediate layer in a plurality of layers such that orientations of the layers in the plurality of layers are varied.

2. The repair patch according to claim 1, wherein the initial tack of the connecting layer is at least 1 N/mm before the vulcanization to the elastomer component.

3. The repair patch according to claim 1, wherein the initial tack of the connecting layer can be adjusted before the vulcanization of the connecting layer with the elastomer component via the selection of a preheating temperature which is at least room temperature and is below the vulcanization temperature of the connecting layer.

4. The repair patch according to claim 1, wherein the connecting layer is formed such that the separation value remains substantially constant or increases for temperatures higher than temperatures of the first temperature interval.

5. The repair patch according to claim 1, wherein at least one peelable protective film is provided that protects the connecting layer from dirt accumulation until the connecting layer contacts the elastomer component.

6. The repair patch according to claim 1, wherein 0.7% to 2.5% of the connecting layer is the accelerator system.

7. A method for connecting a repair patch according to claim 1, comprising the steps:

providing an elastomer component, forming a substantially conical form in the elastomer component as a repair spot, preheating the repair patch to a preheating temperature before attaching the repair patch to the elastomer component, the preheating temperature being below the vulcanization temperature of the connecting layer of the repair patch, attaching the repair patch to the elastomer component, and vulcanizing the repair patch on the elastomer component, the separation value of the connecting layer being at least 5 N/mm after the vulcanization of the connecting layer of the repair patch with the elastomer component.

* * * * *